A. A. SIMON.
FEED BAG.
APPLICATION FILED MAY 9, 1911.
1,001,465.
Patented Aug. 22, 1911.
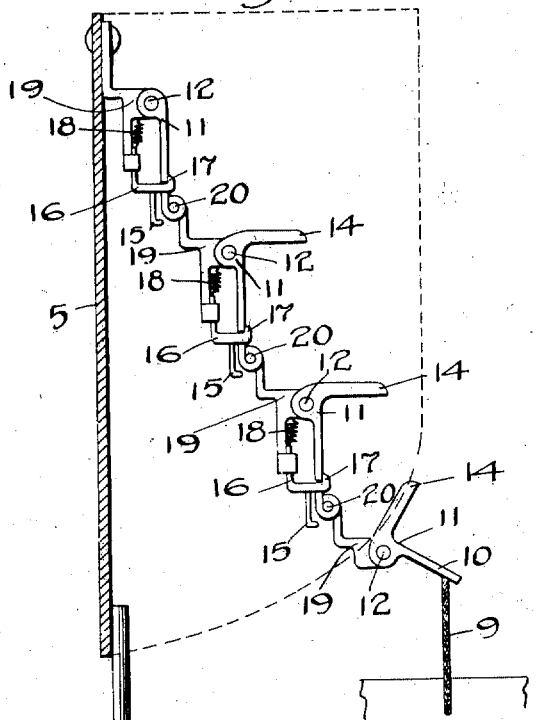
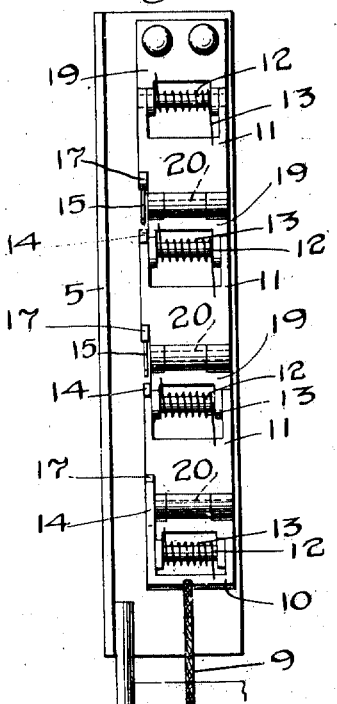
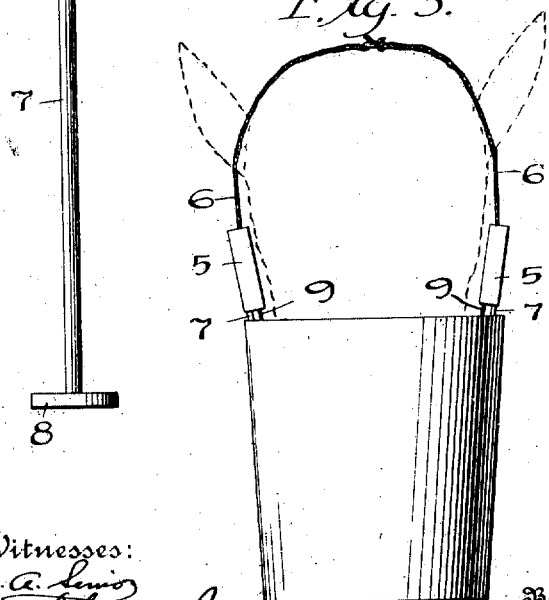
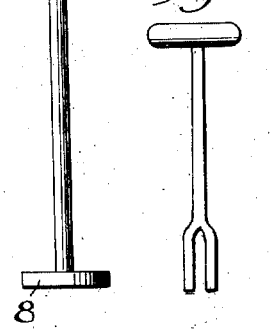
Witnesses:
Inventor
Abraham A. Simon
By Attorney

UNITED STATES PATENT OFFICE.

ABRAHAM A. SIMON, OF NEW YORK, N. Y.

FEED-BAG.

1,001,465.   Specification of Letters Patent.   Patented Aug. 22, 1911.

Application filed May 9, 1911. Serial No. 625,991.

*To all whom it may concern:*

Be it known that I, ABRAHAM A. SIMON, a subject of the Czar of Russia, residing at New York, in the county of New York and State of New York, have invented new and useful Improvements in Feed - Bags, of which the following is a specification.

This invention relates to feed bags and it has for its object means adapted to be attached to the head of a horse to support a bag and capable of adjusting the bag so that the feed will be always within reach of the mouth of the horse as more fully described in the following specification, set forth in the claims and illustrated in the drawings, therein,—

Figure 1 is a side elevation of one of a pair of a series of springs fitted to the horse's head so as to elevate the bag and bring the feed within range of his mouth. Fig. 2 is a front view of the series of springs. Fig. 3 shows the device secured to a horse's head. Fig. 4 shows a key with which the device is operated.

The invention consists of a housing 5 made of sheet metal or other suitable material, one being attached to each side of the horse's head as shown in Fig. 2 and being connected by a strap 6 which passes over the horse's head and each end being attached to the frame itself.

Depending from each frame 5 is a rod 7 having at its lower end a head 8, the rod extending down into the feed bag and the head bearing upon the grain or other feed in the bag so that whatever strain is put upon the bag to lift it upward, resistance is offered by the head 8 which presses against the grain on its upper surface and retains the bag at a certain point. The rod 7 must consequently be of such length as to cause the head 8 to be on line with the animal thereby retaining the upper surface of the grain supply at a point accessible to the mouth of the animal.

The bag is supported by means of a strap or cord 9 which is secured to the outer end 10 of an elbow lever 11. These levers are arranged in series supporting each other and each lever is pivoted on a spindle 12 surrounded by a spring 13 whose tendency is to cause the arm 10 to move upward into a vertical position and the arm 14 of the lever to swing to a horizontal position when it will strike the hook 15 of a slide 16 and force it downward. This slide 16 also has a hook 17 which engages the lower end of the arm 10 of the upper levers and when this hook is disengaged by the downward movement of the slide, the upper lever is freed, allowing the lever to make a half revolution on its pivot and release the lever above. It will thus be seen that all these levers are identical and that each slide 16 is held upward by a spring 18 so that the hook 17 will perform its function.

Each lever is pivoted in an angular bracket 19 pivoted to the upper lever by means of a pin 20 so that as the lower lever swings around, it is allowed to fold under the lever above.

As the feed in the bag is eaten away and the head 8 permits the bag to rise, the levers 11 take their new position and the springs 13 lift the bag upward so as to bring the grain within range of the mouth of the horse.

It is obvious that the parts may be otherwise arranged and modified without departing from the essential features above described.

When it is desired to place the springs in a position to raise the bag, the key shown in Fig. 4 is used to turn the elbow levers 11 down.

What I claim as new and desire to secure by Letters Patent is,—

1. In a feed bag carrier, the combination with frames carrying headed rods, a feed bag to contain the rods and a series of levers in each frame provided with springs to raise the bag as the feed is consumed.

2. In a feed bag, the combination with a bag, of frames carried by the animal and having rods with heads to press upon the grain in the bag, a series of elbow levers carried by the frames and supporting the bag, and springs adapted to rotate the levers so as to elevate the bag.

3. In a feed bag, the combination with frames carried by the animal and having depending rods, of a feed bag, of elbow levers pivoted to each other, and springs on the pivots of the levers to swing the levers.

4. In a feed bag the combination with a bag, of frames carried by the animal, depending rods from the frames and adapted to enter the bag, a series of elbow levers, one of which supports the bag, a hook engaging each adjacent elbow lever and adapted to be disengaged by the lowest lever, a slide carrying the hook and having a spring, and a spring on the pivot of each lever throw it around.

In testimony whereof I affix my signatu in presence of two witnesses.

ABRAHAM A. SIMON.

Witnesses:
CHARLES LA RUE.
JAMES F. DUHAMEL.